April 30, 1929.                E. H. McFARLAND                1,711,238
                                AIR TESTING DEVICE
                               Filed March 3, 1928
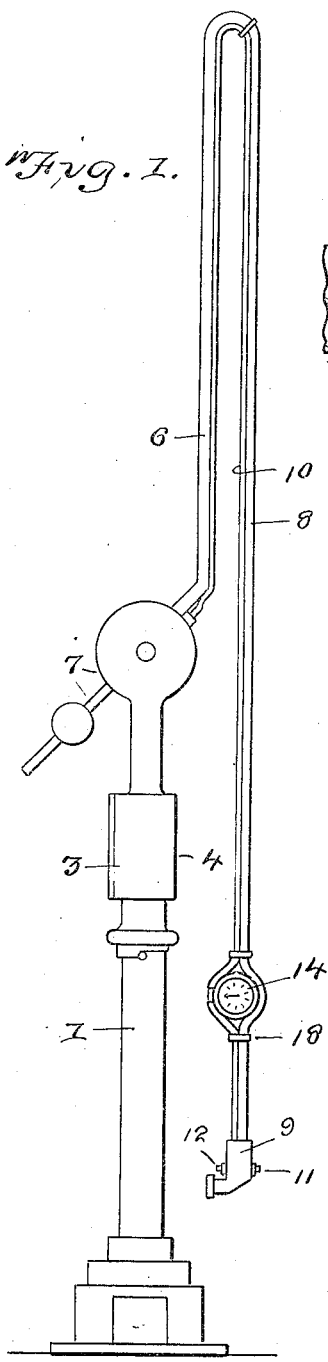
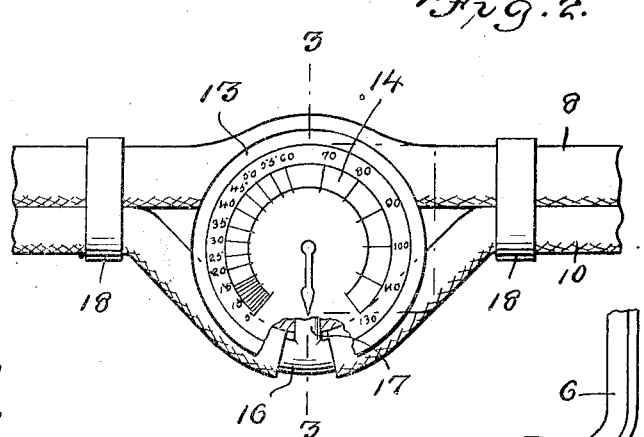
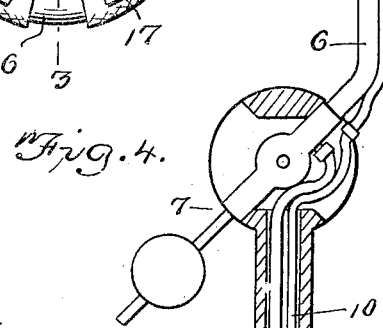
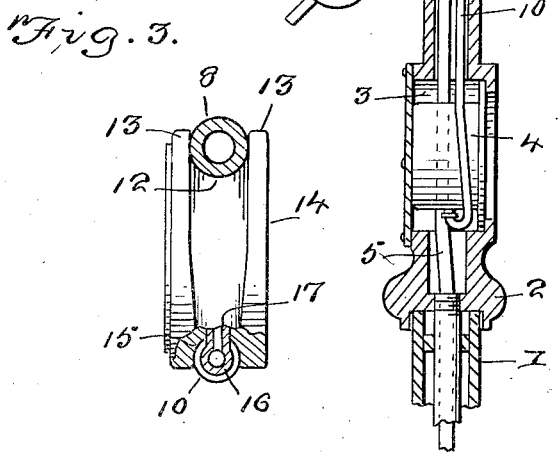
E. H. McFarland,
INVENTOR
BY Victor J. Evans
ATTORNEY Patented Apr. 30, 1929.

1,711,238

UNITED STATES PATENT OFFICE.

ERNEST H. McFARLAND, OF LOUISBURG, NORTH CAROLINA, ASSIGNOR OF ONE-THIRD TO JAMES A. HODGES, OF LOUISBURG, NORTH CAROLINA, ONE-SIXTH TO FRED. M. HODGES, OF RICHMOND, VIRGINIA, AND ONE-SIXTH TO JOHN M. HODGES, OF FAYETTEVILLE, NORTH CAROLINA.

AIR-TESTING DEVICE.

Application filed March 3, 1928. Serial No. 258,989.

My present invention has reference to air inflating and testing means for pneumatic tires and is especially directed to an auxiliary gauge attached between the inflating line and the test line in close proximity to the chuck, so that the operator without changing his position or paying attention to the main gauge may easily and readily read the auxiliary gauge and thereby ascertain the amount of pounds pressure of air that has been let into the tire.

A further object, resides in the provision and construction of parts whereby the auxiliary gauge is not only effectively housed between the flexible air conducting line and the air test line, but is protected from damage by such housing.

To the attainment of the foregoing and other objects which will present themselves the improvement also resides in certain other novel features of construction, combination and operative association of parts, a satisfactory embodiment of which is disclosed by the accompanying drawings.

In the drawings:

Figure 1 is a side elevation of my improvement arranged between the air line and the test line pipes on a tire pressure stand.

Figure 2 is a face view of the improvement.

Figure 3 is a sectional view approximately on the line 3—3 of Figure 2.

Figure 4 is a detail sectional view through a portion of the tire pressure stand to illustrate the manner in which the test line is connected to the gauge that is supported in a pocket in the rotary head of the stand.

Referring now to the drawings in detail, the numeral 1 designates the lower portion of a tire pressure stand. On the lower portion or standard 1 there is arranged a rotatable head 2, and this head is provided with a pocket 3 which has one of its faces closed and its other face flanged to be contacted by the flange on the face portion of an air gauge 4. The back of the gauge 4 is fixed to the closed rear wall of the pocket. The flexible air pipe or line 5 is directed from a suitable source of air supply through the standard 1 and through the head 2, and in the showing of the drawings, enters the tubular arm or pipe portion 6 of a counter-balanced pivotally supported member 7. Of course, the member 7 is pivoted in the slotted head portion proper of the standard, and the outer end of the said pipe member 6 is curved and has attached thereto the flexible air conducting pipe 8 that leads to the chuck 9. Connected directly to the gauge 4 there is the flexible air test pipe or line 10. This pipe is trained along the side of the pipe 6 and is likewise trained along the side of the air line 8.

The chuck 9 has its main passage leading through the mouth thereof and communicating with the air line 8 controlled by a valve, the operating element for this valve being indicated by the numeral 11 and the chuck is also provided with a return air passage which is normally closed by a valve. The operating element for the last mentioned valve is indicated in Figure 1 by the numeral 12.

If desired the fabric facings for the lines 8 and 10 may be stitched or otherwise secured together, but when these lines are so attached they are divided from each other for a portion of their lengths at a point adjacent to the chuck 9. The divided portions of the lines 8 and 10 are received between flanges 13 on the opposite faces of an auxiliary gauge 14. As the air line 8 is of a greater diameter than the test line 10, the groove 15 between the flanges 13 that receives the said air line therein, is of a greater width than the groove 15 between the said flanges that receives the thinner test line 10 therebetween. It is to be noted that the lines when received in the grooves 15 extend outwardly therefrom, so that the lines not only serve as a means for supporting the auxiliary gauge 14 but as a protector for such gauge. The facings of the gauge are constructed of non-breakable material, and in other respects the auxiliary gauge 14 is similar to any ordinary air gauge.

While it is within the province of this invention to provide the air line 10 with the port that communicates with a similar port in the wall of the auxiliary gauge provided by the groove 15 I have, in the showing of the drawings, cut the said line 10 at the parts thereof received in the said groove 15 and inserted in and secured to the confronting ends of the pipe sections the longitudinal branch 16 of a T-member, the lateral branch 17 whereof being received through a suitable opening in the casing for the auxiliary gauge 14.

After the tire has been inflated to what the operator believes a proper amount of pounds pressure, the operating element for the valve that controls the passage between the chuck and the air line is permitted to close, and a pressure is exerted against the element 12 to allow excess air to pass from the tire into the auxiliary gauge 14 and likewise into the gauge 4.

With the improvement the pounds pressure of air in the tire is readily ascertainable by the operator by merely glancing at the auxiliary gauge so that he will not have to leave his position and inspect the main gauge 4 as is ordinary in such constructions. Obviously the air let in the tire may pass directly through the main gauge.

The improvement is of extremely simple construction but the advantages thereof will it is thought, be understood and appreciated by those skilled in the art. With the improvement the employment of a pocket gauge is entirely dispensed with and, as above stated, it is not necessary for the operator to leave his position to inspect the main gauge. With my improvement the auxiliary gauge is not only effectively housed but is protected by such housing. In the showing of the drawings I have illustrated clamps 18 for binding the lines 8 and 10 together at the terminals of the looped portions thereof or at the portions thereof that pass through the grooves 15 between the flanges of the auxiliary gauge 14, but obviously the looped portions of the said lines 8 and 10 may be otherwise connected.

Having described the invention, I claim:

1. In an air testing device for pneumatic tires, comprising a stand having an air gauge and having an air line and an air test line leading from the stand and gauge, and a chuck having valve controlled passages communicating with each of the lines and a stem for operating the valves, the combination of an auxiliary gauge pocketed between the lines adjacent to the chuck and having a port communicating with the test line.

2. In an air testing device, comprising a stand having an air gauge and having an air line and an air test line leading from the stand and gauge and a chuck having a valve controlled passage communicating with each line and a stem for unseating each valve, the combintaion of an auxiliary gauge having side grooves to provide a central peripheral recess therebetween whose inner wall is rounded and on which is seated bulged portions of the respective air and test lines and which air and test lines extend beyond the flanges of the auxiliary gauge, means for holding these parts of the lines looped for tight engagement with the auxiliary gauge, and said auxiliary gauge having a port which communicates with the test line.

3. In an air testing device, comprising a stand having an air gauge, an air line and an air test line leading from the stand and gauge, a chuck having valve controlled passages therethrough, and communicating with the respective lines, and a stem for unseating each valve, the air line being of greater diameter than the air test line and both of said lines being arranged in contacting engagement and having a divided portion near the chuck which is looped, the combination of an auxiliary air gauge having spaced flanges provided with inner rounded walls, to receive the lines therebetween, and the flanges that contact with the air line being spaced a greater distance apart than those that contact with the air test line, said last mentioned line, at its looped portion, being divided and a T-coupler having its longitudinal branch received in the divided branch of the line and its lateral branch received through the casing of the auxiliary air gauge.

In testimony whereof I affix my signature.

ERNEST H. McFARLAND.